United States Patent

[11] 3,592,501

| [72] | Inventors | John Bryan Stokes<br>82 Coppice Road, Will Aston, Nantwich, Cheshire;<br>Alan Roger Griffiths, 23 Harewood Road, Marlow, Buckinghamshire, both of, England |
|---|---|---|
| [21] | Appl. No. | 777,427 |
| [22] | Filed | Nov. 20, 1968 |
| [45] | Patented | July 13, 1971 |
| [32] | Priority | Nov. 21, 1967 |
| [33] | | Great Britain |
| [31] | | 52967/67 |

[54] HOLDER FOR A DISPOSABLE BEVERAGE CONTAINER
5 Claims, 6 Drawing Figs.

[52] U.S. Cl. ................................................... 294/32, 220/85, 248/145.6
[51] Int. Cl. ...................................................... A47j 45/07
[50] Field of Search ........................................... 248/145.6; 220/94 A, 85 H; 215/100 A; 229/1.5 H; 294/27 H, 31 A, 33, 32

[56] References Cited
UNITED STATES PATENTS

| 2,075,217 | 3/1937 | Milburn ....................... | 294/33 |
| 2,631,883 | 3/1953 | Ross............................. | 294/33 |
| 2,804,335 | 8/1957 | Seillgebauer ................ | 294/33 |
| Des. 165,782 | 1/1952 | Parker.......................... | 220/94 A |
| 899,290 | 9/1908 | Bricker........................ | 248/145.6 |
| 1,088,779 | 3/1914 | Jahn............................. | 248/145.6 |
| 1,389,594 | 9/1921 | Moore.......................... | 220/85 H |
| 2,122,628 | 7/1938 | Tracy........................... | 220/94 A |
| 2,784,578 | 3/1957 | Southwick................... | 220/85 H |

FOREIGN PATENTS

| 406,979 | 12/1909 | France ......................... | 220/94 A |
| 1,337,902 | 8/1963 | France ......................... | 215/100 A |

Primary Examiner—Edward C. Allen
Attorneys—Michael Kovac, Robert W. Beart, Barry L. Clark and Jack R. Halvorsen ABSTRACT: A holder for disposable beverage containers is provided with a platform to support the base of the container and resiliently curved arms which embrace the sidewalls of the container, the curved arms being connected to a hairpin-shaped handle which is sufficiently flexible to provide aggressive engagement of the resilient curved arms on the sidewalls of the container when the hairpin limbs of the handle are gripped by a user.

PATENTED JUL 13 1971

HOLDER FOR A DISPOSABLE BEVERAGE CONTAINER

On the market there are numerous types of disposable containers for beverages dispensed by vending machines. Usually, such containers do not have handles integrally formed or supplied with them, it being necessary to grip the containers by means of their sidewalls. Although flutes or ribs are provided on the sidewalls to facilitate gripping, when hot beverages are contained the gripping of the sidewalls can prove distinctly uncomfortable.

It is therefore desirable to provide a holder into which the container can be inserted and which incorporates a handle.

The present invention has for its object the provision of a holder suitable for use with the majority of disposable beverage containers at present on the market within a chosen capacity range.

According to the invention a holder for a disposable container for beverages includes a platform to support the base of a container, resilient curved arms to embrace the sidewalls of the container, and a handle, and the handle is constituted by a member which is hairpin-shaped in plan, with the limbs of the hairpin joined to respective ones of the curved arms, and the member having a downward extension joined to the platform.

By this arrangement of the curved arms and the limbs of the handle, the curved arms can be sprung apart to accept a container of larger diameter and the grip of a person's fingers on the sides of the handle thereafter tends to urge the arms into closer engagement with the container walls. The extremity of the handle where its limbs join, forms a sort of hinge about which each arm and limb flexes.

Preferably the holder is integrally moulded of a resilient plastics material which provides the necessary resilience to accept and grip a container.

An example of a holder according to the invention is shown in the accompanying drawings in which.

The holder illustrated is suitable for use with containers in the capacity range 7 to 10 fluid ounces (200 to 280 ml.).

Figure 2:
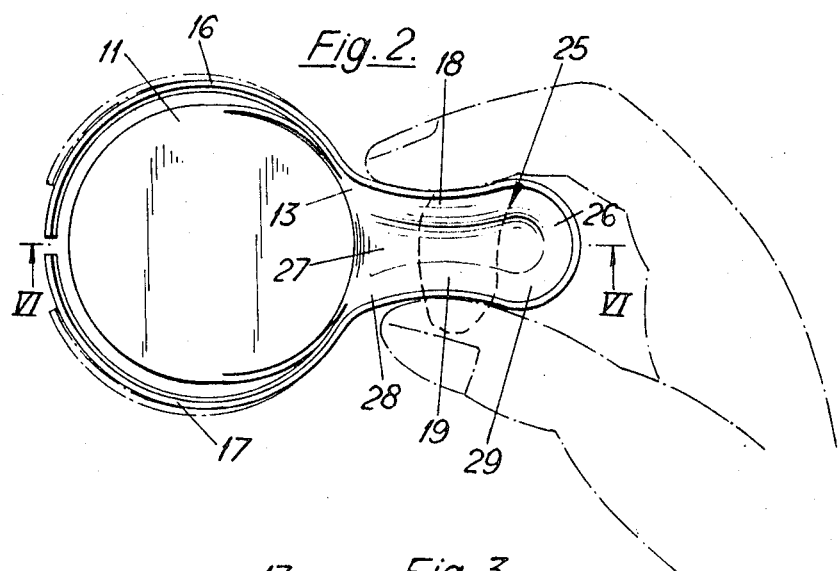
FIG. 2 is a plan.
Figure 3:
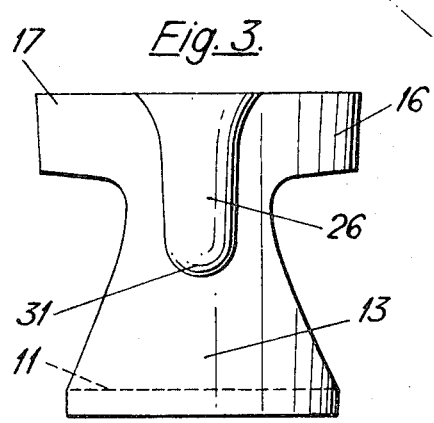
FIG. 3 is an end elevation, as seen along the arrow III of FIG. 1.
Figure 6:
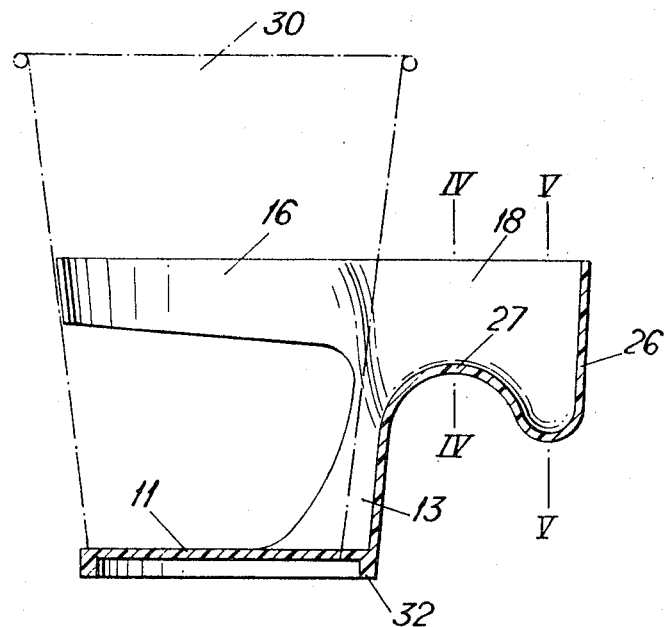
FIG. 6 is a vertical section taken on the line VI–VI of FIG. 2.

As illustrated in the FIGS., the holder includes a slightly oval platform 11 to support the base of a container 30 (indicated in FIG. 6), resilient curved arms 16, 17 to embrace the sidewalls of a container, and a handle 25. The handle is constituted by a member which is hairpin-shaped in plan, as shown in FIG. 2, with the limbs 18, 19 of the hairpin joined to respective arms 16, 17, and joined together by a curved portion 26. The member has a downward extension 13 joined to the platform 11.

The member, its downward extension, and the curved arms, are all of substantially uniform thickness, while the platform has a thickened rim 32 underneath. The entire holder is integrally moulded of polypropylene.

The handle has an underside constituted by a bridging portion 27 which joins the limbs 18, 19 of the handle together, at a level below the arms 16, 17, and blends at its outer end into the portion 26, and at its inner end into the downward extension 13. The underside and the limbs of the handle are formed so as to aid location of the thumb and index and middle fingers of a person using the holder, as indicated in FIG. 2.

Figure 1:
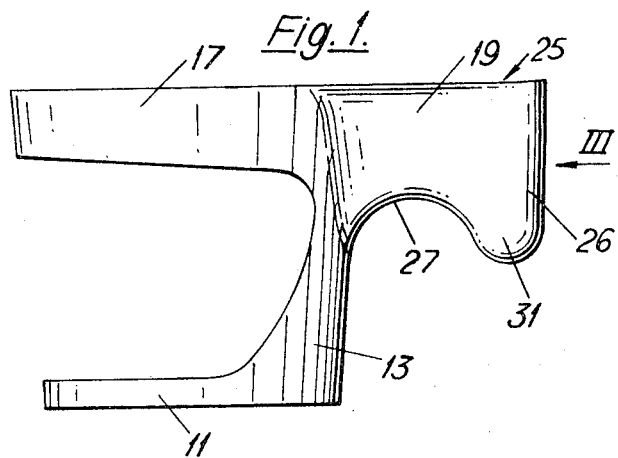
FIG. 1 is a side elevation.

In particular, the bridging portion 27 is concave downwards in side elevation (FIGS. 1 and 6); each limb of the handle is flared away from the other limb adjacent to its free upper edge 23, 24 (FIG. 4); and each limb of the handle, considered in plan (FIG. 2), has, adjacent to the respective arm 16, 17, a portion 28 which is convex towards the other limb, and further from the arm (further to the right in FIG. 2) has a portion 29 which is concave towards the other limb. Thus the handle includes a downward knob 31 near its outer end.

Figure 4:
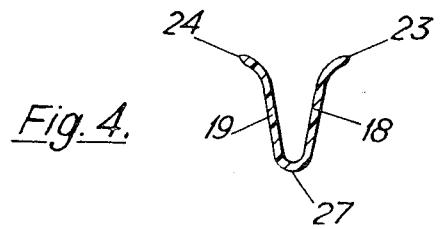
FIG. 4 and FIG. 5 are cross sections of the handle taken on the lines IV–IV and V–V, respectively of FIG. 6.
Figure 5:
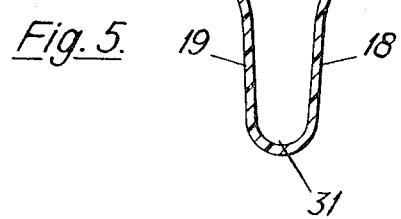

FIGS. 4 and 5, being sections taken through the handle 20, clearly show the limbs 18, 19 connected by the bridging portion 27, and also show the outwardly flared edges 23, 24 at the top of the handle. These edges, together with all other edges of the holder, are chamfered to remove sharp corners.

The shape of the holder is designed, to perform its function as a container holder and to be visually acceptable, and to be readily integrally moulded of a resilient plastics material such as polypropylene or high impact polystyrene.

We claim:

1. A one-piece integrally molded holder for a disposable container for beverages including a platform to support the base of a complementary container, a wall member of segmental extent extending upwardly from said platform and having a handle element extending laterally outwardly therefrom, said handle member consisting of a pair of opposed spaced wall portions extending laterally outwardly and in generally diverging relation in a direction away from said platform and connected by a bight portion thereby forming a hollowed-out generally U-shaped handle, and a pair of resilient curved arms extending from said pair of opposed wall portions in a direction away from said bight portion and in overlying spaced relation relative to said platform, said pair of opposed spaced wall portions being sufficiently flexible when gripped by a user to provide aggressive engagement of the resilient curved arms on the sidewall of the complementary container.

2. A holder according to claim 1, in which the member, its downward extension, and the curved arms, are all of substantially uniform thickness.

3. A holder according to claim 2, in which the opposed spaced wall portions of the handle are joined together by a bridging portion at a level below the curved arms.

4. A holder according to claim 3, in which the bridging portion is concave downwards in side elevation.

5. A holder according to claim 2, in which each opposed spaced wall portions of the handle, considered in plan, has, adjacent to the respective arm, a portion which is convex towards the other opposed spaced wall portions, and further from the arm has a portion which is concave towards the other opposed spaced wall.